No. 863,503. PATENTED AUG. 13, 1907.
R. A. BRIGHT & A. W. DAVIS.
CIGAR TRIMMING AND MOLDING MACHINE.
APPLICATION FILED MAR. 22, 1906.

5 SHEETS—SHEET 3.

WITNESSES.
A.G. Pieczentkowski.
James T. Toole.

INVENTORS.
Richard A. Bright
and Arthur W. Davis
Horatio E. Bellows
BY
ATTORNEY.

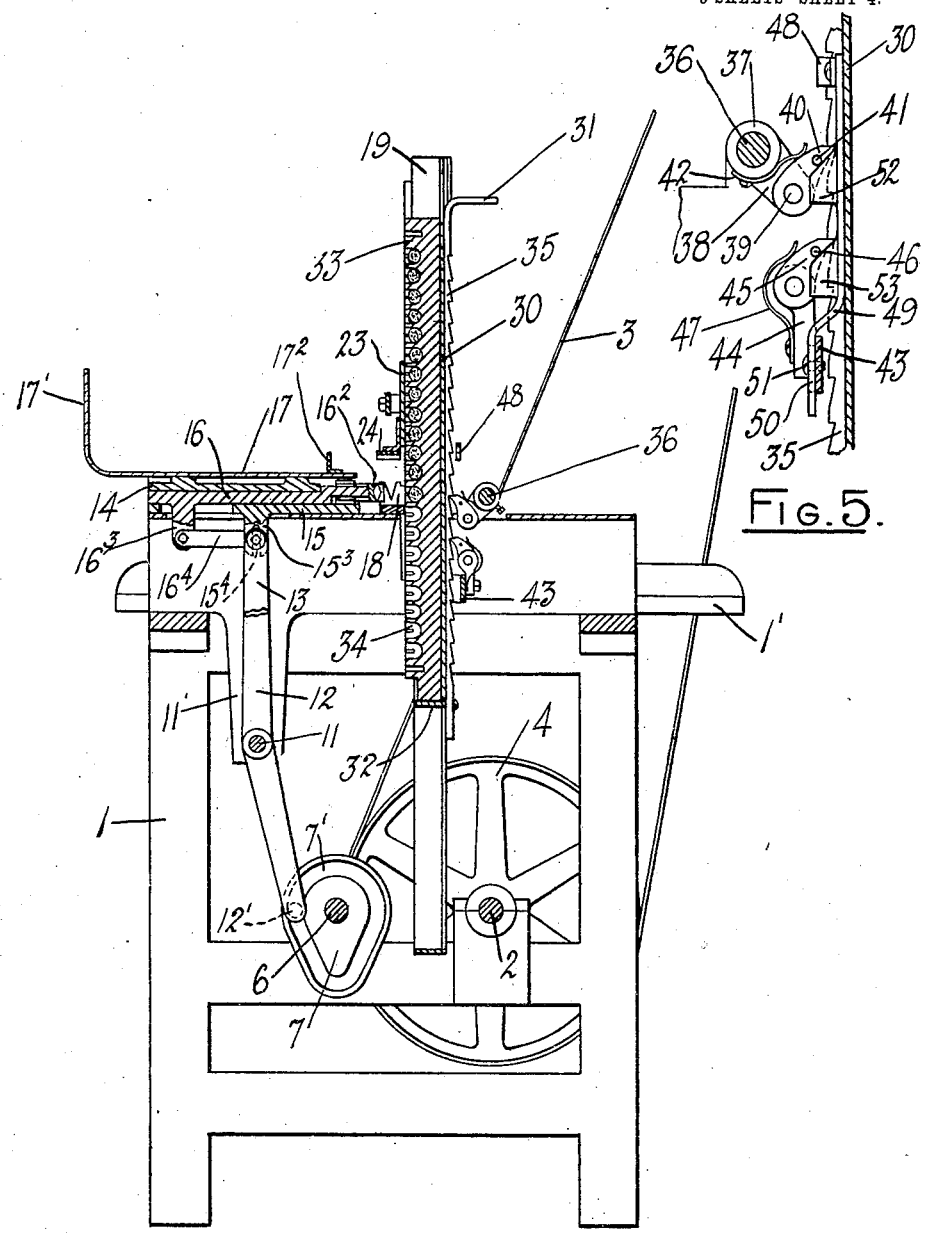

No. 863,503. PATENTED AUG. 13, 1907.
R. A. BRIGHT & A. W. DAVIS.
CIGAR TRIMMING AND MOLDING MACHINE.
APPLICATION FILED MAR. 22, 1906.
5 SHEETS—SHEET 5.
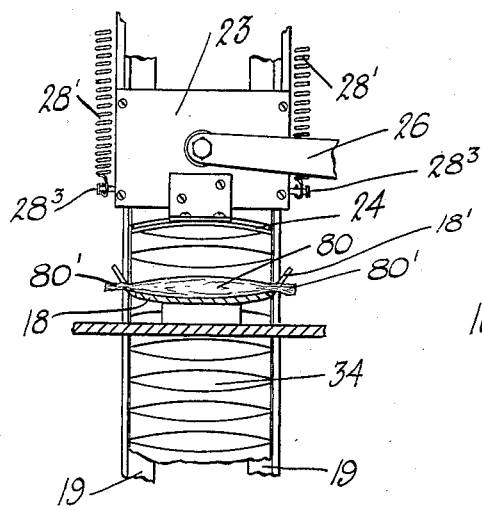
Fig. 7.
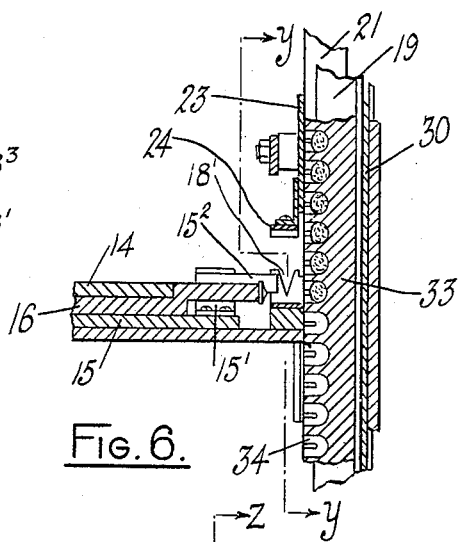
Fig. 6.
Fig. 8.
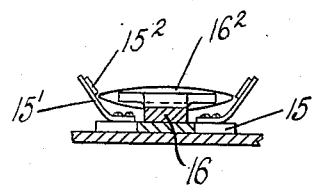
Fig. 9.
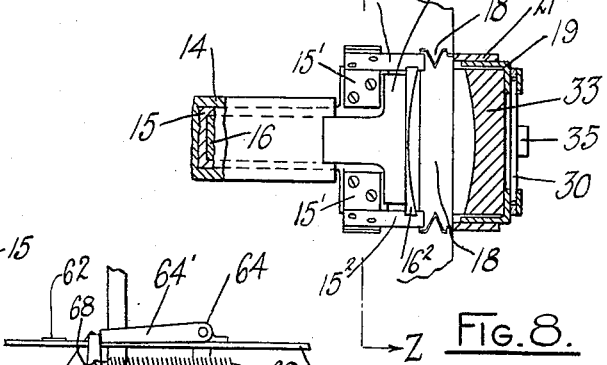
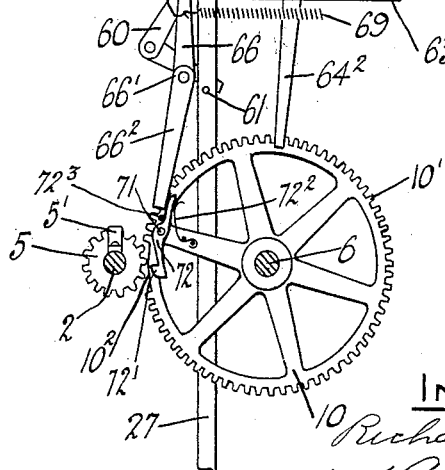
Fig. 10.
WITNESSES.
A.G. Pieczentkowski.
James T. Foole.
INVENTORS.
Richard A. Bright
and Arthur W. Davis
By Horatio E. Bellows
ATTORNEY.

UNITED STATES PATENT OFFICE.

RICHARD A. BRIGHT AND ARTHUR W. DAVIS, OF CRANSTON, RHODE ISLAND, ASSIGNORS TO THE ACME TOBACCO COMPANY, A CORPORATION OF MAINE.

CIGAR TRIMMING AND MOLDING MACHINE.

No. 863,503.     Specification of Letters Patent.     Patented Aug. 13, 1907.

Application filed March 22, 1906. Serial No. 307,527.

*To all whom it may concern:*

Be it known that we, RICHARD A. BRIGHT and ARTHUR W. DAVIS, both citizens of the United States, residing at Cranston, in the county of Providence and State of Rhode Island, have invented certain new and useful Improvements in Cigar Trimming and Molding Machines, of which the following is a specification, reference being had therein to the accompanying drawing.

Our invention relates to machines for trimming and molding cigars.

In a pending application we have described a machine which renders the filler bunch inclosed by a binder having ends projecting beyond the extremities of the bunch. The projecting binder ends must be removed preparatory to molding.

The primary objects of the invention are to remove these ends, and insert the trimmed bunch in the molds, and effect these objects in a simple and speedy manner.

The invention consists in providing a coacting injector and cutting mechanism, a novel coöperating mechanism for actuating and adjusting the mold board, and an original combination of parts for controlling and throwing in and out of action the operative parts of the device.

Further novel objects will be hereinafter described and claimed.

Figure 1:
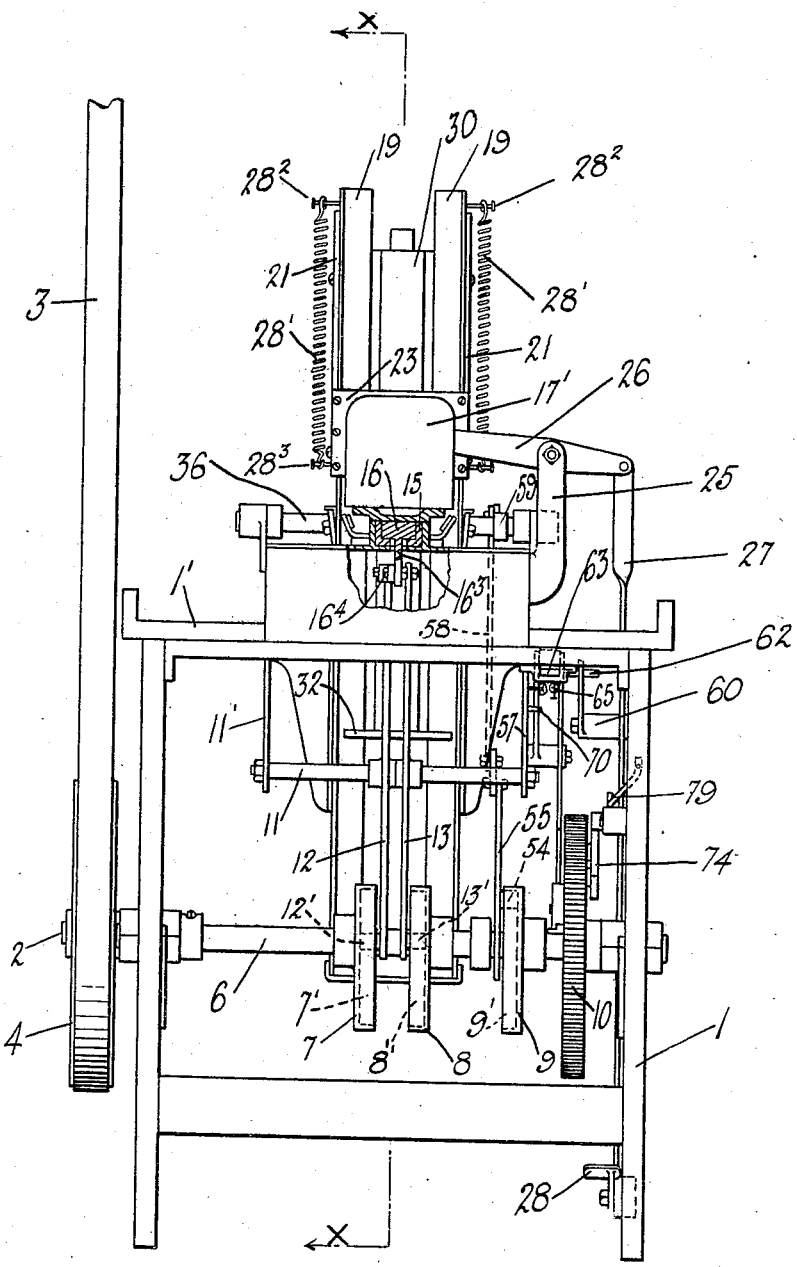
Figure 2:
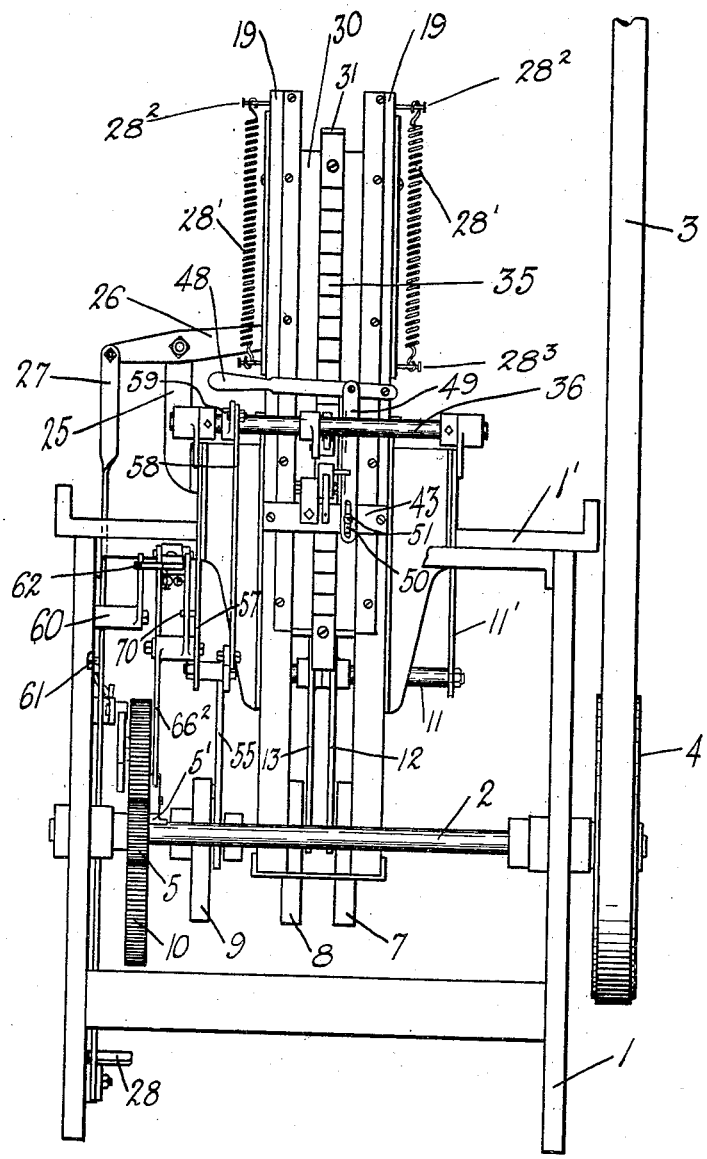
Figure 3:
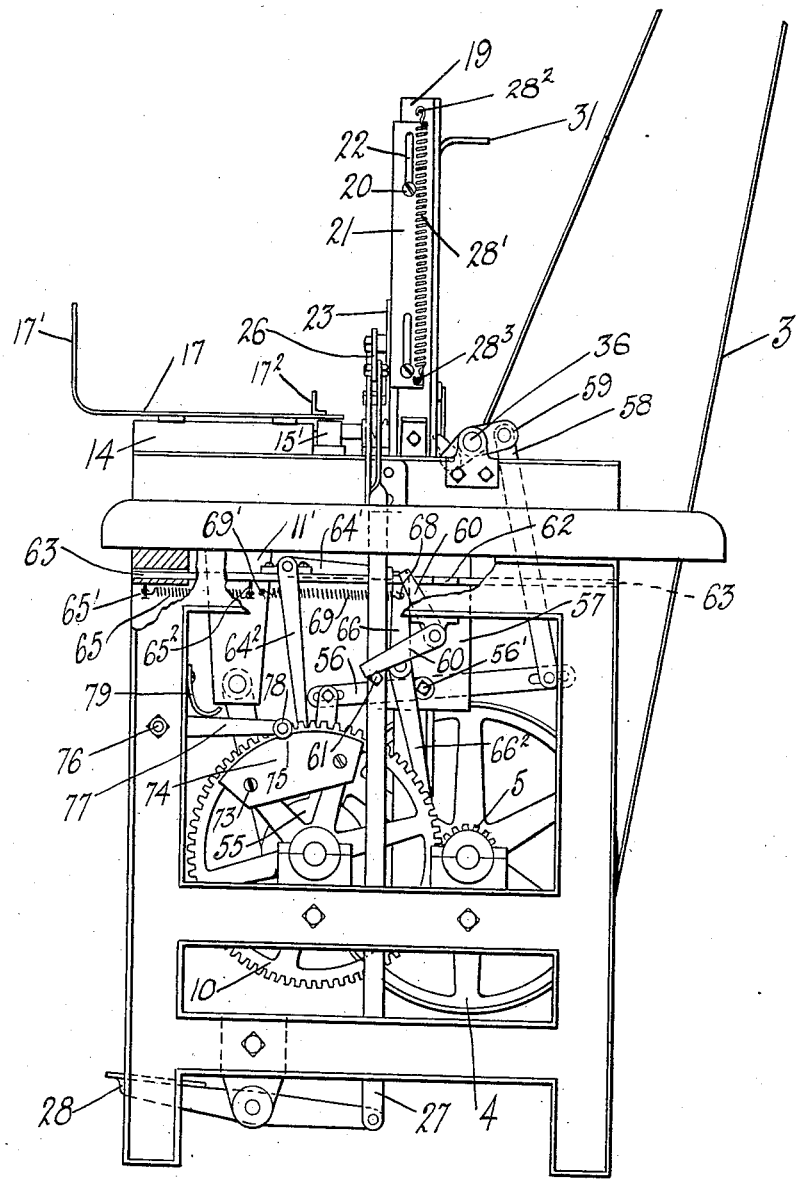

In the accompanying drawings, Figure 1 is a front elevation of a machine embodying our invention, having a portion broken away, and showing the injector or ram and adjacent parts in transverse section. Fig. 2, a rear elevation of the complete machine. Fig. 3, a side view of the same with parts of the frame broken away. Fig. 4, a section of a portion of the same on line $x\,x$ of Fig. 1. Fig. 5, a side elevation of the rack bar and pawls. Fig. 6, a longitudinal section of a portion of the charging and cutting mechanism and adjacent parts. Fig. 7, vertical transverse section of the same on line $y\,y$ of Fig. 6. Fig. 8, a plan view of the portion of the charging and cutting mechanism, showing the adjacent mold and connected parts in transverse section. Fig. 9, a transverse section on line $z\,z$ of Fig. 8, and Fig. 10, a side view of the starting and stopping device.

Like characters of reference indicate like parts throughout the views.

The frame work may be of any form of construction suitable for carrying the several details of mechanism. In the form thereof herein shown it consists essentially of a frame comprising standards, 1, and a table, 1′, supported thereby. Revolubly supported in the standards of the frame is a driving shaft, 2, actuated by a belt, 3, through pulley 4. To this shaft is fixed a pinion, 5, provided with a lateral lug or projection, 5′. Mounted in the standards in the same horizontal plane with the first shaft is a second or cam shaft, 6, carrying cams, 7, 8 and 9, which are oval in outline and provided upon their side faces with channels, 7′, 8′ and 9′ respectively. The channel, 7′, however, is preferably longer than the channel, 8′. The shaft, 6, also carries a mutilated toothed or spur wheel, 10, the major portion of whose periphery is provided with teeth, 10′, while the remainder is smooth, $10^2$, as shown in Fig. 10. Pivoted intermediate their length upon a bar, 11, supported by a bracket, 11′, depending from the table, are two cam levers, 12 and 13, carrying upon their respective lower ends studs or rollers, 12′, and 13′, which travel in the cam channels, 7′ and 8′, of the cams, 7 and 8. The upper ends of these levers are connected with and actuate the cutting and charging tools which will now be described.

Upon the table of the frame is fixed a guide block, 14, in which is mounted a cutter slide, 15, upon whose end upwardly and outwardly inclined are lateral plates, 15′, carrying inclined blades, $15^2$. If desired the plates and even the blades may constitute an integral part of the slide. In the block, 14, is also slidably mounted an injector, ram, or plunger, 16, having a broad head, 16′, provided with a concaved extremity, $16^2$, to conform to the shape of a cigar bunch. The slide, 15, and injector, 16, are provided respectively with downwardly projecting lugs, $15^3$ and $16^3$. The lug, $15^3$, is provided with a slot, $15^4$, and is pivoted therethrough to the cam lever, 13. The lug $16^3$ is connected with the cam lever, 12, by a link, $16^4$. The rotation of the shaft, 6, through the levers, 12 and 13, impart a reciprocating movement to the injector and cutter, but the greater length of the cam channel, 8′, over the cam channel 7′ serves to continue the advance of the injector, 16, after the advance of the cutter slide, 15, has ceased. For the purpose of temporarily supporting the bunches to be operated upon there is provided a plate, 17, with an upturned extremity, 17′ and a transverse intermediate flange or guard, $17^2$.

On the table adjacent the ends of the cutter and injector is fixed a transversely disposed oblong plate, 18, with upwardly inclined ends provided with V shaped marginal recesses 18′. The recesses are preferably beveled to facilitate the cutting or shearing action of the blades, $15^2$ which are so positioned as to slide across and in contact with the upturned ends of the plate, which is practically a concave cutter plate adapted to the shape of the bunch to be operated upon, and upon which the bunch rests during the shearing operation.

Vertically mounted in the frame are mold board guides, 19, to whose outer sides are slidably connected by pins, 20, flat bars, 21, provided with slots, 22, through which the pins pass. A plate, 23, in front of the board guides connect the two bars, and with the parts described constitute a vertical slide. Mounted upon the lower margin of the slide, and above the cutter plate, 18, is a concave presser plate, 24, somewhat shorter than the latter. The operative mechanism of the presser slide includes an arm, 25, extending upwardly from the frame at one side of the block guides, to which is pivoted a lever, 26, one of whose ends is pivoted to the plate, 23, and whose other end is pivoted to the upper end of a vertical rod, 27. The latter is connected at its lower end to a foot lever, 28, pivoted to one of the frame standards. The frame is upwardly tensioned by a retractile spring, 28', whose ends are fixed pins, $28^2$ in the guides, 19, and to pins $28^3$ in the plates 21.

In grooves, 29, in guides, 19, slides a mold holder consisting of a plate, 30, with a handle, 31, projecting from its upper end, and a flange, 32, upon its lower end, upon which rests the mold, 33, provided with the usual cavities, 34. Fixed to the back of the holder or integral therewith is a vertical rack bar, 35, with downwardly inclined teeth.

It is required that the mold be intermittently elevated. The mechanism by which this is accomplished includes a horizontal rock shaft, 36, in the frame behind the mold guides. Referring to Fig. 5, the shaft carries a collar, 37, provided with a lug, 38, to which is pivoted by a pin, 39, a pawl, 40, with a lateral pin, 41. This pawl is pressed by a spring, 42, on the collar, 37, into engagement with the teeth of rack 35. Below the pawl 40 and upon the guides 19 is a cross bar, 43, with a lug, 44, to which is pivoted a second pawl, 45, having a lateral pin, 46, in vertical alinement with the pawl pin, 41. The pawl, 45, is pressed into the rack teeth by a spring 47, fixed to the lug, 44. In operative position one or both pawls always engage the rack teeth. When, however, any accident occurs to a bunch during the loading of any given mold receptacle which makes it desirable to depress the mold one or more steps or intervals, both pawls are temporarily thrown out of engagement by the following device. To the back of one of the mold guides is pivoted a hand lever, 48, whose end is connected with an upright cam bar, 49, having a vertical slot, 50, to receive a pin, 51, fixed to the cross bar, 43. The cam bar is provided with two cam projections, 52 and 53, upon whose inclined faces rest the cam pins, 41 and 46 respectively. The depression of the free end of the lever, 48, raises the bar, 49, and holds the pawls out of engagement with the rack bar teeth during the depression of the mold holder 30 the desired distance.

The upward impulse to the rack bar 30 is imparted through the pawl, 40. The mechanism by which this pawl is actuated comprises the cam, 9, in whose channel, 9', travels the cam roll or stud, 54, of the forked lever, 55, whose end is connected with one extremity of a lever, 56, pivoted to a stud, 56', on a bracket, 57, depending from the table of the frame. The other end of the lever, 56, is connected with a link, 58, which in turn is connected with a lever arm, 59, carried by the rock shaft, 36. Through the connections described the shaft, 6, intermittently raises the pawl, 40, which is so disposed in relation to the pawl, 45, that the latter is engaging and supporting one of the rack teeth whenever the pawl, 40, is disengaged preparatory for engaging the next successive tooth.

Referring to the mechanism for throwing the machine in and out of operation, a bell crank lever, 60, is mounted in a standard of the frame, one of whose arms engages a stud, 61, on the pedal rod, 27, and the other of whose arms is adapted to contact with a lug, 62, upon a horizontal rod, 63, slidably mounted in the frame. To the rod, 63, is pivoted a gravity lever, 64, whose horizontal arm, 64', has excessive upward travel interrupted by the table of the frame, and whose gravity arm, $64^2$ is downwardly inclined. The rod, 63, is pressed towards the front of the machine by a retractile spring, 65, whose ends are connected with pins, 65' and 65 in the frame and bar respectively. The lever arm, 64', normally rests upon the upper arm, 66, of a bell crank lever, 66', whose lower arm, $66^2$, lies adjacent the margin of the inner face of the toothed wheel, 10. The lever, 66', is mounted upon a plate, 57, and its arm, 66, has a pin, 68, to which is connected a retractile spring, 69, whose other end is fixed to a pin, 69', in the bracket, 11', by which means the lever arm is normally forced toward the forward part of the machine. Excessive movement in this direction is limited by the stop, 70, on the plate, 57.

Upon the inner margin of the toothed wheel adjacent the smooth portion of the periphery, $10^2$, is pivoted by a pin, 71, a curved lever, 72, whose lower end carries a tooth, 72', and whose upper end is outwardly pressed by a spring, $72^2$, fixed to the wheel, 10. The curved lever is in the same vertical plane with the projection, 5', of the pinion, 5. The tooth, 72', however, is normally held by the spring, $72^2$, outside the path of the projection, 5'. The spring also keeps the upper end of the lever, 72, in contact with the lower extremity of the lever arm, $66^2$, and against a stop, $72^3$. In the described position of the parts, the pinion 5 rotates without imparting movement to the wheel, 10. If, however, the arm, $66^2$, is forced inwardly the tooth, 72', is thereby forced into the path of the projection, 5', and when the latter in its rotation strikes the pivoted tooth, 72', the pinion teeth engage the wheel teeth, and rotate the wheel, 10, a revolution or until the blank space, $10^2$ is again reached. The lever arm, $66^2$, receives its inward impulse by the depression of the foot lever, 28, which through bar, 27, and lever, 60, rearwardly slides the plate, 63, thereby forcing the horizontal lever arm, 64', against the lever arm 66, whereby the arm, $66^2$ holds the curved tooth lever, 72, in engaged position.

In order to insure that at the end of each rotation of the toothed wheel it shall not by its impetus span the toothless interval, $10^2$ and reëngage the teeth of the pinion wheel, unless the foot lever, 28, is depressed, there is provided the following stop mechanism. Fixed to the outer face of the wheel, 10, by screws, 73, is a segmental plate, 74, whose periphery is provided with curved depression, 75. Tightly pivoted to the frame standard near the wheel, 10, by a screw, 76, is an arm, 77, whose end carries an antifriction roller, 78. The arm is downwardly pressed by a spring, 79, whereby the roller, 78, is forced into the depression or notch, 75, of the plate, 54, upon each rotation of the wheel, 10. The depression, 75, is so disposed in relation to the mutilated portion, $10^2$ of the wheel, 10, that when the blank surface reaches a position opposite the pinion, 5, the roller, 78, registers with the notch, 75, and thereby prevents over rotation. If desired the driven wheel, 10, may be completely toothed, and the described starting and stopping mechanism be omitted, thereby driving the operative mechanisms directly and with greater speed. But better results are believed to accrue by giving the operator an opportunity after each operation to correct any error in feeding or replace imperfect material.

The general operation of the machine is as follows: The operator places in the holding or cutter plate, 18, a bunch, shown as 80, in Fig. 7, whose protruding ends, 80′, rest in the notches, 18′. The foot lever, 28, is depressed, thereby depressing through its described connections the presser or guide plate, 24, upon the bunch, 80, whereby the bunch is firmly held during the cutting operation and is guided during its transfer to the mold cavity. The depression of the foot lever referred to also throws the wheel, 10, into operative relation with the driving pinion, 5, in the manner already described, whereby the cam shaft, 6, is rotated and the cutter and injector are simultaneously advanced through cams 7 and 8, and their connecting levers. The blades and injector then retreat preparatory to a second advance. Meanwhile the board, 33, is elevated sufficiently to bring another cavity into the plane of the injector, by means of cam 9, pawl 40, and their connecting mechanism. It is to be noted that the injecting means is movable in a plane with the shearing device, and while movable simultaneously therewith, the injecting means continues its movement after the advance of the shearing device has ceased. The inclined blades $15^2$ coact with the upturned inclined ends of the plate 18 to shear the cigar bunch on an incline instead of vertically. This is important, for among other results, it avoids "bunching" or closing the strands of the filler upon the ends and thereby impeding the drawing or smoking of the cigar.

What is claimed as new is:—

1. A machine of the type set forth embodying a plate for supporting a cigar bunch, a shearing device, injecting means movable in a plane therewith, and means for simultaneously moving said shearing and injecting means, the injecting means being constructed to continue its movement after the advance of the shearing device has ceased.

2. A machine of the type set forth embodying a supporting plate with upturned ends provided with notches adapted to receive a cigar bunch, shearing blades in the plane of the bunch and positioned to traverse the bunch adjacent said upturned ends, an injector also in the plane of the bunch and adapted to traverse the plate intermediate said ends, said blades and said injector being movable toward and from the bunch, and means for moving the injecting means and operating the blades.

3. A machine of the type set forth embodying a plate for supporting a cigar bunch, blades in the plane of the bunch and adapted to traverse the bunch upon the supporting plate, said blades being movable toward and from the holding plate, means movable toward and from the supporting plate for retaining the bunch in engagement with the supporting plate during the advance of the blades and means for so moving the blades and holding means.

4. A machine of the type set forth embodying a mold board having a plurality of cavities, means simultaneously movable in a horizontal plane for shearing and injecting cigar bunches, into the cavities, and means for intermittently elevating the mold board and for actuating said shearing and injecting means inwardly toward the mold board after the completion of the mold board movement.

5. A machine of the type set forth embodying a mold board having a plurality of cavities, means for shearing and injecting the bunches into the cavities, said shearing and injecting means being movable with respect to the mold board, means for actuating the mold board, and for simultaneously moving said shearing and injecting means away from the mold board, and for returning said shearing and injecting means inwardly at the completion of the mold board movement.

6. A machine of the type set forth embodying a step by step vertically movable mold board having a plurality of cavities, means for intermittently moving the mold board, means actuated by said mold board actuating means for injecting cigar bunches into the cavities, and horizontally slidable means for shearing the bunches.

7. In a machine of the type set forth means for automatically holding, shearing, and feeding cigar bunches, said means being simultaneously actuated from a single drive shaft and movable together for a part of their travel, and the feeding device constructed to continue its movement after the advance of the shearing device has ceased.

8. In an automatic machine for operating upon cigar bunches the combination of the following instrumentalities; a bunch supporting plate, a plate for pressing the bunch upon the supporting plate, means for shearing the bunches, mold board cavities adapted to receive the said bunches, means for feeding the sheared bunches from the supporting plate to the cavities, said instrumentalities being timed and actuated from a single shaft.

9. In a machine of the type set forth, the combination with the frame, of a slidable mold carrier in the frame, a ratchet bar on the carrier, two pawls one above the other engaging the ratchet bar, lateral projections upon the pawls, a vertically disposed cam bar slidably mounted upon the frame adjacent the pawls, cam surfaces upon the cam bar, against which the pawl projections normally rest, and a lever pivoted to the frame and connected with the end of the cam bar.

10. In a machine of the type set forth the combination with the frame and main shaft, of cams upon the shaft, a cutter and injector slidably mounted in the frame, levers connecting the cams with the cutter and injector, a mutilated toothed wheel upon the main shaft, a driving shaft in the frame, a pinion on the driving shaft adapted to mesh with the toothed wheel, and means upon the pinion coacting with means upon the toothed wheel for throwing the pinion in mesh with the toothed wheel.

11. In a machine of the type set forth the combination with the frame and main shaft, of a toothed wheel provided with a mutilated portion mounted in the frame, a lever provided with a tooth and pivoted to the wheel adjacent the mutilated portion, a driving shaft in the frame, a pinion on the driving shaft adapted to mesh with the wheel, a projection upon the pinion in the plane of the lever, and means for swinging the lever to bring the lever tooth in the path of the projection.

12. In a machine of the type set forth the combination with the frame and main shaft, of a mutilated toothed wheel upon the main shaft, a plate upon the toothed wheel provided with a peripheral depression, an arm pivoted to the frame adjacent the toothed wheel, a roller on the arm adapted to register in the depression of the plate at the end of each rotation of the toothed wheel, spring means for pressing upon the arm to hold the roller in contact with the plate, a driving shaft in the frame, a pinion on the driving shaft adapted to mesh with the mutilated toothed wheel, a projection on the pinion and means upon the toothed wheel coacting with the projection to throw the pinion in mesh with the toothed wheel after the roller has registered in the depression.

13. In a machine of the type set forth, a vertically movable mold board, a horizontally movable shearing device, a fixed supporting plate with notched up-turned ends and an injector movable in a plane with the shearing device and movable therewith and constructed to continue its movement after the advance of the shearing device has ceased.

14. In a machine of the type set forth, the combination with the plate having upwardly inclined ends and adapted to receive a cigar bunch, of inclined blades coacting with said inclined ends to shear the cigar bunch on an incline.

In testimony whereof we have affixed our signatures in presence of two witnesses.

RICHARD A. BRIGHT.
ARTHUR W. DAVIS.

Witnesses:
HORATIO E. BELLOWS,
FRED I. COZZENO.